(12) United States Patent
McDonald et al.

(10) Patent No.: US 9,942,750 B2
(45) Date of Patent: Apr. 10, 2018

(54) PROVIDING AN ENCRYPTED ACCOUNT CREDENTIAL FROM A FIRST DEVICE TO A SECOND DEVICE

(71) Applicant: QUALCOMM Incorporated, San Diego, CA (US)

(72) Inventors: Cameron A. McDonald, Queenscliff (AU); Matthew C. Duggan, Tokyo (JP); Craig M. Brown, Harbord (AU)

(73) Assignee: QUALCOMM Incorporated, San Diego, CA (US)

( * ) Notice: Subject to any disclaimer, the term of this patent is extended or adjusted under 35 U.S.C. 154(b) by 261 days.

(21) Appl. No.: 13/748,376

(22) Filed: Jan. 23, 2013

(65) Prior Publication Data

US 2014/0208112 A1    Jul. 24, 2014

(51) Int. Cl.

| H04L 29/06 | (2006.01) |
|---|---|
| H04W 12/04 | (2009.01) |
| G06F 21/41 | (2013.01) |
| H04L 9/08 | (2006.01) |
| G06F 21/34 | (2013.01) |

(Continued)

(52) U.S. Cl.
CPC ............ *H04W 12/04* (2013.01); *G06F 21/34* (2013.01); *G06F 21/41* (2013.01); *H04L 9/085* (2013.01); *H04L 63/0435* (2013.01); *H04L 63/083* (2013.01); *H04L 63/0815* (2013.01);
(Continued)

(58) Field of Classification Search
CPC ... H04L 63/10; H04L 63/0428; H04L 63/062; H04L 63/083; H04L 63/0853; H04L 9/0861; H04L 9/3226; H04L 63/0815; H04L 9/085; H04L 63/0492; H04L 9/0872; G06F 21/41; G06F 21/60; G06F 21/31;
(Continued)

(56) References Cited

U.S. PATENT DOCUMENTS 5,623,546 A    4/1997    Hardy et al.
6,084,968 A *  7/2000    Kennedy et al. ............. 380/259
(Continued)

FOREIGN PATENT DOCUMENTS

CN    1921395 A    2/2007
CN    1949241 A    4/2007
(Continued)

OTHER PUBLICATIONS

Chuang, et al., "A Novel Secret Sharing Technique Using QR Code", International Journal of Image Processing (IJIP), vol. (4) : Issue (5), 2010, pp. 468-475.
(Continued)

*Primary Examiner* — Thaddeus Plecha
(74) *Attorney, Agent, or Firm* — BSTZ

(57) ABSTRACT

Disclosed is an apparatus, system, and method to decrypt an encrypted account credential at a second device that is received from a first device. The second device may receive a first share of a master key and the encrypted account credential from the first device. The second device may reconstruct the master key with the first share of the master key and a second share of the master key stored at the second device. The second device may decrypt the encrypted account credential with the reconstructed master key. Based upon the decrypted account credential, the second device may be enabled to access an account based upon the decrypted account credential.

61 Claims, 5 Drawing Sheets

(51) Int. Cl.
*H04W 4/00* (2018.01)
*H04L 9/32* (2006.01)

(52) U.S. Cl.
CPC ............ *H04L 63/0853* (2013.01); *H04L 9/32* (2013.01); *H04L 2463/061* (2013.01); *H04W 4/008* (2013.01)

(58) Field of Classification Search
CPC ........ G06F 21/62; G06F 21/30; G06F 21/602; G06F 21/6245; H04W 12/08; H04W 12/06
USPC ..... 380/277, 278, 281; 713/171, 182; 726/2, 726/4–5, 26–29
See application file for complete search history.

(56) References Cited

U.S. PATENT DOCUMENTS

| | | | |
|---|---|---|---|
| 7,089,417 B2* | 8/2006 | Wack | H04L 63/0428 380/283 |
| 7,343,014 B2 | 3/2008 | Sovio et al. | |
| 7,463,861 B2 | 12/2008 | Eisenbach | |
| 7,636,854 B2* | 12/2009 | Muller | G06F 21/32 713/186 |
| 8,260,262 B2 | 9/2012 | Ben | |
| 9,455,968 B1* | 9/2016 | MacHani | H04W 12/04 |
| 2002/0062451 A1* | 5/2002 | Scheidt | G06F 21/31 726/7 |
| 2002/0071566 A1* | 6/2002 | Kurn | H04L 63/062 380/281 |
| 2002/0076045 A1* | 6/2002 | Scheidt | H04L 9/0866 380/44 |
| 2006/0183462 A1 | 8/2006 | Kolehmainen | |
| 2007/0043950 A1 | 2/2007 | Imanishi et al. | |
| 2007/0239615 A1* | 10/2007 | Matsuzaki | G06K 19/07749 705/55 |
| 2010/0297946 A1 | 11/2010 | Alameh et al. | |
| 2012/0246706 A1 | 9/2012 | Brown et al. | |
| 2013/0238894 A1* | 9/2013 | Ferg | H04L 9/321 713/155 |
| 2013/0263211 A1* | 10/2013 | Neuman | H04L 63/08 726/1 |
| 2014/0071054 A1* | 3/2014 | Koch | G06F 3/0488 345/168 |
| 2018/0004930 A1* | 1/2018 | Csinger | G06F 21/40 |

FOREIGN PATENT DOCUMENTS

| | | |
|---|---|---|
| CN | 101719205 A | 6/2010 |
| CN | 101895513 A | 11/2010 |
| CN | 102202308 A | 9/2011 |
| GB | 2348309 A | 9/2000 |
| JP | H1125051 A | 1/1999 |
| JP | 2000276445 A | 10/2000 |
| JP | 2003108525 A | 4/2003 |
| JP | 2004151863 A | 5/2004 |
| JP | 2007052513 A | 3/2007 |
| JP | 2007108833 A | 4/2007 |
| WO | 2010095988 A1 | 8/2010 |

OTHER PUBLICATIONS

Geer E Daniel et al., "Split-and-Delegate: Threshold Cryptography for the Masses", Mar. 11, 2002 (Mar. 11, 2002), Financial Cryptography, [Lecture Notes in Computer Science], Springer Berlin Heidelberg, Berlin, Heidelberg, pp. 220-237, XP019053702, ISBN: 978-3-540-00646-6.

International Search Report and Written Opinion—PCT/US2014/012126—ISA/EPO—dated Jul. 23, 2014.

* cited by examiner

PROVIDING AN ENCRYPTED ACCOUNT CREDENTIAL FROM A FIRST DEVICE TO A SECOND DEVICE

BACKGROUND

Field

The present invention relates to an apparatus and method to provide an encrypted account credential from a first device to a second device.

Relevant Background

Users of computing devices typically have many different accounts for accessing online services and applications. These accounts typically require account credentials, such as, a username and a password. For security reasons, users are recommended to use different usernames and different passwords for different accounts. Therefore, it is quite common for a user to have many unique usernames and passwords.

Remembering and managing all of these usernames and passwords by a user can be very difficult. Also, when creating new passwords that need to be remembered, it is quite common for a user to choose a simple password based on a small subset of available characters. This may lead to weak passwords.

Moreover, users are accessing these accounts from a wide range of different computing devices (e.g., both mobile devices and non-mobile devices). For example, these different computing devices may include: home computers, work computers, mobile phones, mobile devices, tablets, etc. Therefore, users need to have access to their account credentials at different locations with different devices.

Unfortunately, storing all of these account details in human memory by a user, as previously mentioned, is very difficult. Further, storing these details on a written sheet of paper or in a device that is kept by the user, enables mobility, but is not secure and is prone to theft which can result in undesired access to a user's accounts.

SUMMARY

Aspects of the invention may relate to an apparatus, system, and method to provide an encrypted account credential from a first device to a second device. The second device may receive a first share of a master key and the encrypted account credential from the first device. The second device may reconstruct the master key with the first share of the master key and a second share of the master key stored at the second device. The second device may decrypt the encrypted account credential with the reconstructed master key. Based upon the decrypted account credential, the second device may be enabled to access an account based upon the decrypted account credential.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Figure 1:
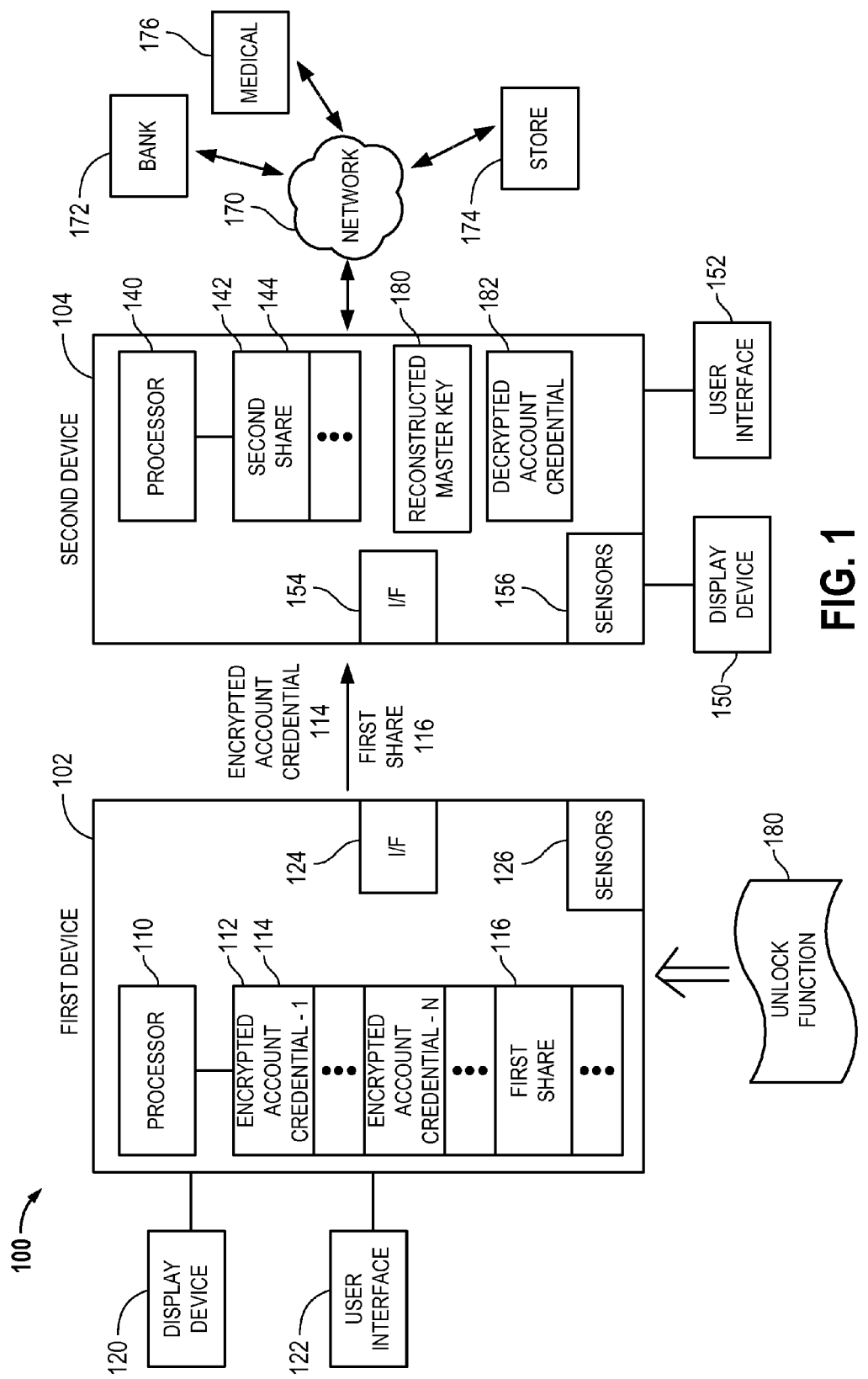
FIG. 1 is a diagram of a system in which aspects of the invention related to a providing an encrypted account credential from a first device to a second device may be practiced.

With reference to FIG. 1, FIG. 1 is a diagram of a system 100 in which embodiments of the invention may be practiced. In particular, system 100 illustrates embodiments of the invention related to methods and apparatuses that allow an encrypted account credential 114 to be provided from a first device 102 to a second device 104 such that the second device 104 may be enabled to access an account based upon the decrypted account credential.

As will be described, the second device 104 may receive a first share 116 of a master key and an encrypted account credential 114 from the first device 102. The second device 104 may reconstruct the master key 180 with the first share 116 of the master key received from the first device 102 and a second share 144 of the master key stored at the second device 104. The second device 104 may then decrypt the encrypted account credential 114 with the reconstructed master key 180 to create a decrypted account credential 182. The second device 104 may then enable access to an account for a user based upon the decrypted account credential 182.

Examples of implementations will be hereinafter described. For example, first device 102 may include a processor 110, a memory 112, a display device 120, a user interface 122, an interface (I/F) 124, and sensors 126. Similarly, second device 104 may include a processor 140, a memory 142, a display device 150, a user interface 152, an interface (I/F) 154, and sensors 156. Processors 110 and 140 of first and second devices 102 and 104 may be configured to execute operations to be hereinafter described. Memories 112 and 142 may store operations, applications, programs, routines, etc., to aid implementing these operations and functions. First and second devices 102 and 104 may include common device features such as display devices 120 and 150, user interfaces 122 and 152 (e.g., a keyboard, a keypad, a touch screen input, etc.), communication interfaces 124 and 154, and sensors 126 and 156.

As will be described, first and second devices 102 and 104 may be mobile devices, non-mobile devices, wired devices, wireless devices, or any type of computing device. As an example, first and second devices 102 and 104 may be any type of computing device, such as: personal computers, desktop computers, laptop computers, mobile computers, mobile devices, wireless devices, personal digital assistants, wireless phones, cell phones, smart phones, tablets, near field communication (NFC) cards, or any type of mobile or non-mobile computing device.

As an example, first device 102 and second device 104 may include any type of interface (I/F) 124 and 154 for communication with one another via a wired or wireless link to communicate information such as the encrypted account credential 114 and the first share 116 of the master key. As an example, the I/Fs utilized may be wired or wireless based adapters/modems (e.g., a cable/wire modem or a wireless modem (a transceiver) that includes a wireless receiver and transmitter) to receive and transmit data through a link. For example, WiFi I/Fs, cellular phone I/Fs, USB I/Fs, or any type of I/F structure may be utilized. It should be appreciated that any type of I/F structure may be utilized. Additionally, second device 104 may include I/Fs to communicate with networks 170 (e.g., the Internet) to enable access to an account for a user based on the decrypted account credential 182 for a user such as a bank account from a bank website 172, a store account from an on-line store website 174, a medical account 176 through a medical website, etc. It should be appreciated that these are merely examples of accounts at websites and that any type of account on any type of network may utilize aspects of the invention.

Further, first device 102 and second device 104 may include sensors 126 and 156. These sensors 126,156 may be utilized to unlock the devices. These sensors 126,156 may include proximity sensors, motion sensors, accelerometer sensors, position sensors, location sensors, pressure sensors, microphones, cameras, sound sensors, light sensors, etc. Various examples will be hereinafter provided.

Embodiments of the invention relate to providing an encrypted account credential 114 from a first device 102 to second device 104 such that the second device 104 can utilize the decrypted account credential 182 in order to enable it to access an account (e.g., a bank account from a bank website 172, a store account from an on-line store website 174, a medical account 176 through a medical website, etc.). It should be appreciated that first device 102 may store a number of encrypted account credentials 114 (e.g., encrypted account credential-1 through encrypted account credential-N) in memory 112.

In one embodiment, an encrypted account credential 114 may be selected by a user of first device 102 for a particular account. Processor 114 of first device 102 may associate a first share 116 of a master key assigned to the encrypted account credential 114 and may command the transmission of the encrypted account credential 114 and the first share 116 via I/F 124 to the second device 104. It should be appreciated that memory 112 may store multiple encrypted account credentials (1-N) 114 and associated shares 116 for various different accounts.

Second device 104 under control of processor 140 may receive the first share 116 of the master key and the encrypted account credential 114 from the first device 102. The second device 104 may reconstruct the master key 180 with the first share 116 of the master key received from the first device 102 and a second share 144 of the master key stored in memory 142 at the second device 104. Based upon the reconstructed master key 180, second device 104 may then decrypt the encrypted account credential 114 with the reconstructed master key 180 such that it has the complete decrypted account credential 182.

As an example, the decrypted account credential 182 may include the user's username and password. The second device 104 may be enabled to access an account for a user based upon the decrypted account credential 182. As an example, a user may be on a website that is requesting a username and a password, based upon the decrypted account credential 182 that includes the username and password, the user may be automatically enabled to access the account (e.g., a bank account from a bank website 172, a store account from an on-line store website 174, a medical account 176 through a medical website, etc.). In this way, the username and password are automatically entered such that the user does not have to manually enter them. In some embodiments, the decrypted account credential 182 may include the website address as well.

Figure 2:
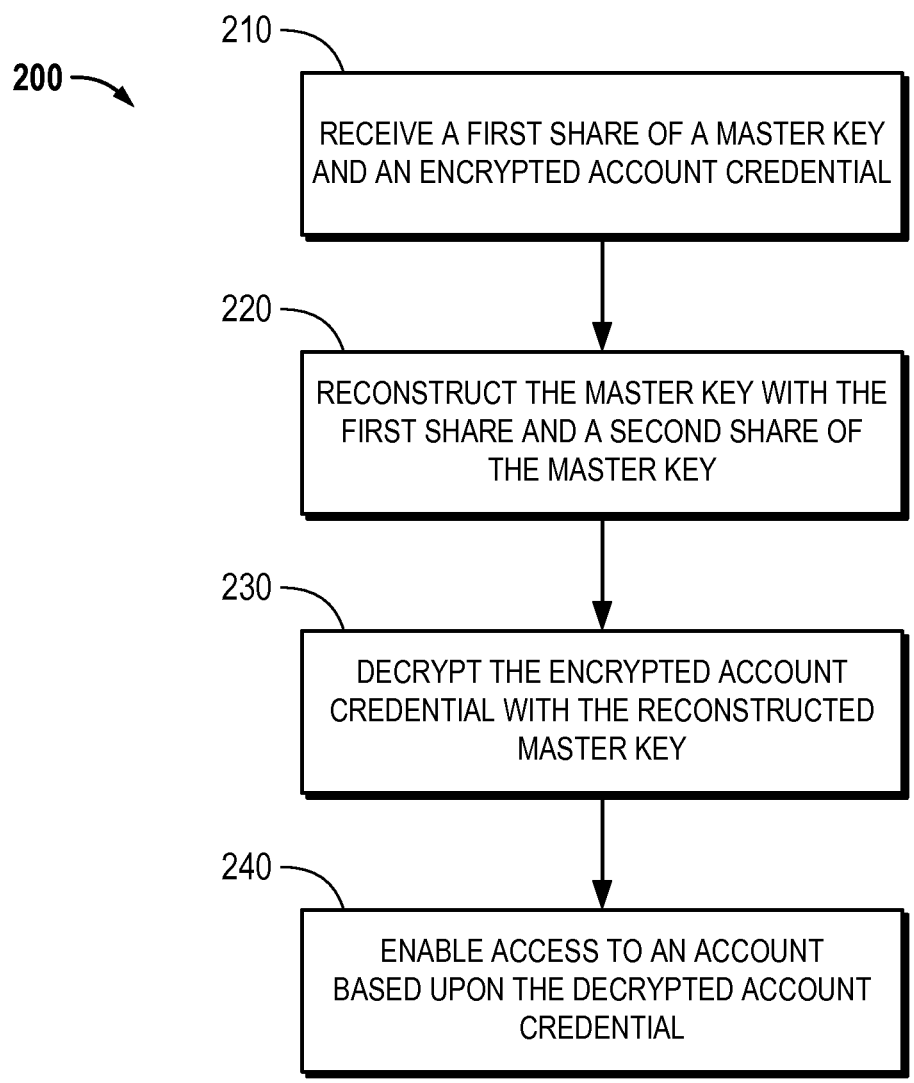
FIG. 2 is a flow diagram illustrating a process to receive an encrypted account credential and to decrypt the encrypted account credential.

Referring briefly to FIG. 2, FIG. 2 is a flowchart illustrating a process 200 to provide an encrypted account credential from a first device to a second device. For example, at block 210, a second device 104 receives a first share 116 of a master key and an encrypted account credential 114 from a first device 102. At block 220, the second device 104 reconstructs the master key 180 with the first share 116 of the master key and a second share 144 of the master key. Next, at block 230, the second device 104 decrypts the encrypted account credential 114 with the reconstructed master key 180. At block 240, the second device 104 may then be enabled to access an account for a user based on the decrypted account credential 182, as previously described.

Figure 3:
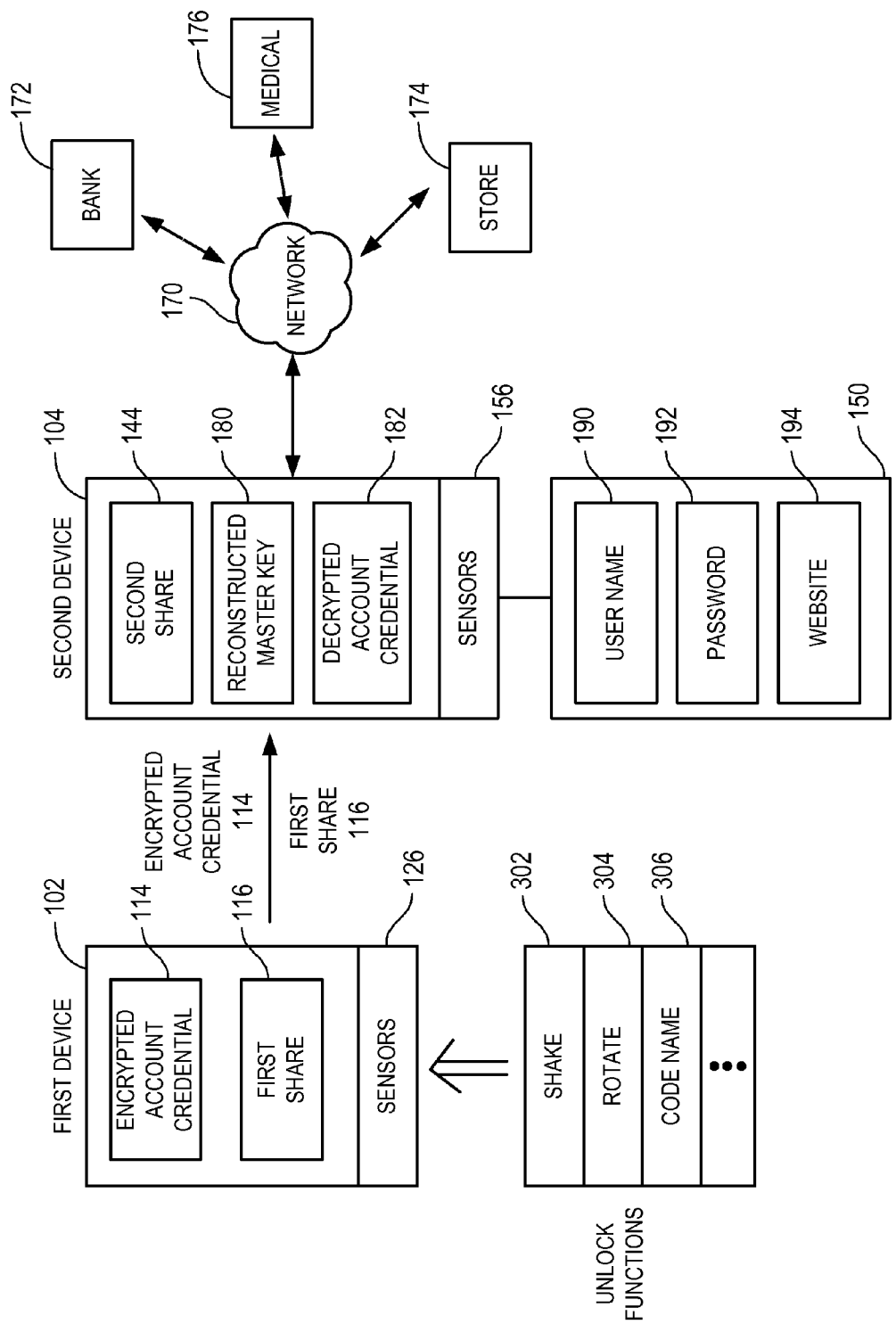
FIG. 3 is a diagram illustrating examples of utilizing an unlocking function to unlock the first device and to allow it to communicate with the second device.

With additional reference to FIG. 3, various examples will be hereinafter described. In one embodiment, an unlocking function may be used at the first device 102 to unlock the first device 102 and to allow it to communicate with the second device 104. As an example, a physical action applied to the first device 102 as an unlocking function allows for the transmission of the encrypted account credential 114 and the first share 116 to the second device 104 to enable access to the account for a user through the second device 104.

As an example, once a proximity sensor 126 of the first device 104 recognizes that the first and second device are within a pre-defined physical proximity range, the first device 102 may transmit the encrypted account credential 114 and the first share 116 of the master key to the second device 104. The second device 104 may then: receive the first share 116 of the master key and the encrypted account credential 114; reconstruct the master key 180 with the first share 116 of the master key received from the first device 102 and the second share 144 of the master key stored at the second device 104; decrypt the encrypted account credential 114 with the reconstructed master key 180; and enable access to an account (e.g., bank account 172, on-line store account 174, medical account 176, etc.) for a user based on the decrypted account credential 182.

As previously described, the decrypted account credential 182 may include the username 190 and the password 194 that may automatically appear on the website 194 on display device 150 of the second device 104 such that the username and password are automatically entered by the second device 104. In this way, the user obtains automatic access to the desired account (e.g., bank account 172, on-line store account 174, medical account 176, etc.) without having to physically enter the username or the password such that the process is very easy for the user as well as very secure. It should be appreciated that the bank account, on-line store account, medical account, are merely examples and that embodiments of the invention relate to obtaining secure access to any type of account.

A wide variety of different types of unlocking functions for the first device 102 may be accomplished by a physical action applied to the first device 102 that may sensed by a sensor 126 of the first device 102. In particular, there may be a pre-defined physical action applied by a user to unlock the first device 104. Examples of the physical action may include shaking 302 the first device 102, rotating 304 the first device 102, or speaking a code name 306 to the first device 104. For example, a motion sensor 126 may be utilized to recognize the shaking 302 unlocking function or the rotating 304 unlocking function. As another example, a microphone sensor 126 may be utilized to input the code name 306 spoken by a user as the unlocking function. The code name 306 may be a specific pre-defined code word to unlock the first device 102.

Other examples of unlocking functions may include a user: pressing against the screen of the display of the first device 102 using three fingers; pressing one or more pre-defined buttons (e.g., keyboard buttons or display buttons) on the first device 102; providing a fingerprint or facial picture to enable fingerprint or facial recognition on the first device 102. It should be appreciated that a wide variety of different types of sensors 126 on the first device may 102 may utilized to recognize these unlocking functions. As previously described these types of sensors 126 may include proximity sensors, motion sensors, accelerometer sensors, position sensors, location sensors, pressure sensors, microphones, cameras, sound sensors, light sensors, etc. Also, sensors 156 on the second device 104 may be utilized as well.

By utilizing these unlocking functions, an extra level of security may be provided. It should be appreciated that any type of physical action may be pre-defined and utilized and that the previously described unlocking functions are merely examples. Further, it should be appreciated that physical action to provide an unlocking function for a first device 102 is particularly useful when the first device 102 is a wireless device or mobile device (e.g., mobile phone, cell phone, tablet, etc.) and the second device 104 is a wired device or non-mobile device (e.g., a desktop computer at work or at home).

One particular example will be hereinafter described as an illustration. For example, a first device 102 may be brought within a pre-defined physical proximity range of the second device 104. Proximity sensor 126 of first device 102 may detect that the first device 102 is within the pre-defined physical proximity range with the second device 104. Next, a physical shaking action 302 may be applied to first device 102 (e.g., it is shaken by user). The shaking action 302 may be detected by motion sensor 126 of the first device 104. Based upon the pre-defined proximity range and the shaking action being detected by the sensors 126, and acknowledgement by the first device 102, first device 102 may then transmit the encrypted account credential 114 and the first share 116 of the master key to the second device 104. The second device 104 may then: receive the first share 116 of the master key and the encrypted account credential 114; reconstruct the master key 180 with the first share 116 of the master key received from the first device 102 and the second share 144 of the master key stored at the second device 104; decrypt the encrypted account credential 114 with the reconstructed master key 180; and enable access to an account (e.g., bank account 172, on-line store account 174, medical account 176, etc.) for a user based on the decrypted account credential 182.

In this way, the user has his or her username 190 and password 192 automatically transmitted to the second device 104 in a secure manner for authentication. Thus, the user does not have to enter their username and password, and may not even know them, and the user can easily utilize the second device 104 to access their account (e.g., bank account 172, on-line store account 174, medical account 176, etc.). This is accomplished in very secure and easy fashion.

As another particular example, the first device 102 may be a near field communication (NFC) card that, when brought within range of the second device 104, transmits the encrypted account credential 114 and the first share 116 of the master key to the second device 104. In this way, the user has his or her username and password automatically transmitted to the second device 104 in a secure manner for authentication. Various additional security measures may also be implemented in conjunction with the encrypted account credential 114, such as, the encrypted account credential 114 may further include randomized data. Also, a digital signature may be transmitted with the encrypted account credential 114 to the second device 104 for authenticity and to prevent tampering. Further, the master key may be encrypted with a master password for additional security.

Therefore, by combining a secret sharing scheme of shares of a master key with a physical unlocking function, increased security is provided while providing mobility. As an example, a user may wish to log onto a website on their home computer [second device 104]. The encrypted account credential 114 and the first share 116 of the master key may be stored on a mobile device (e.g., cell phone, tablet, etc.) [first device 102]—instead of being stored on the home computer. Communication between the mobile device 102 and the home computer 104 allows the mobile device 102 to provide the encrypted account credential 114 and the first share 116 of the master key to the home computer 104 and performs an authentication process on the home computer's behalf. As previously described, the home computer 104 may: receive the first share 116 of the master key and the encrypted account credential 114; reconstruct the master key 180 with the first share 116 of the master key received from the mobile device 102 and the second share 144 of the master key stored at the second device 104; decrypt the encrypted account credential 114 with the reconstructed master key 180; and enable access to an account (e.g., bank account 172, on-line store account 174, medical account 176, etc.) for a user based on the decrypted account credential 182.

As previously described, the decrypted account credential 182 may include the username 190 and the password 194 that may automatically appear on the display device 150 of the home computer 104, as well as being automatically entered by the home computer 104, such that the user obtains automatic access to the desired account on website 194 (e.g., bank account 172, on-line store account 174, medical account 176, etc.) without having to physically enter the username or the password. This provides a process that is very easy for the user as well as very secure. Further, this adds convenience for users who access multiple computers regularly as they do not have to remember every username and password. Additionally, as previously described, to even further help secure the credentials on the mobile device 102, a physical interaction with the mobile device 102 may be performed as the "unlocking function" (e.g., shaking 302, rotating 304, code name 306, etc.), before the encrypted account credential 114 is supplied to the home computer 104.

Although embodiments have been previously described in which a first and second device have been utilized, it should be appreciated that encrypted account credentials may be distributed to multiple devices such that a user may use multiple devices to easily communicate with other devices in an easy and secure manner to access different accounts. Also, embodiments of the invention may relate to generating and sharing a master key between multiple devices (e.g., first, second, third, etc., devices) using a secret sharing scheme. Each device may contain a "share" of the master key, and a number of the shares can be used simultaneously to recover the entire master key (N of M).

Figure 4:
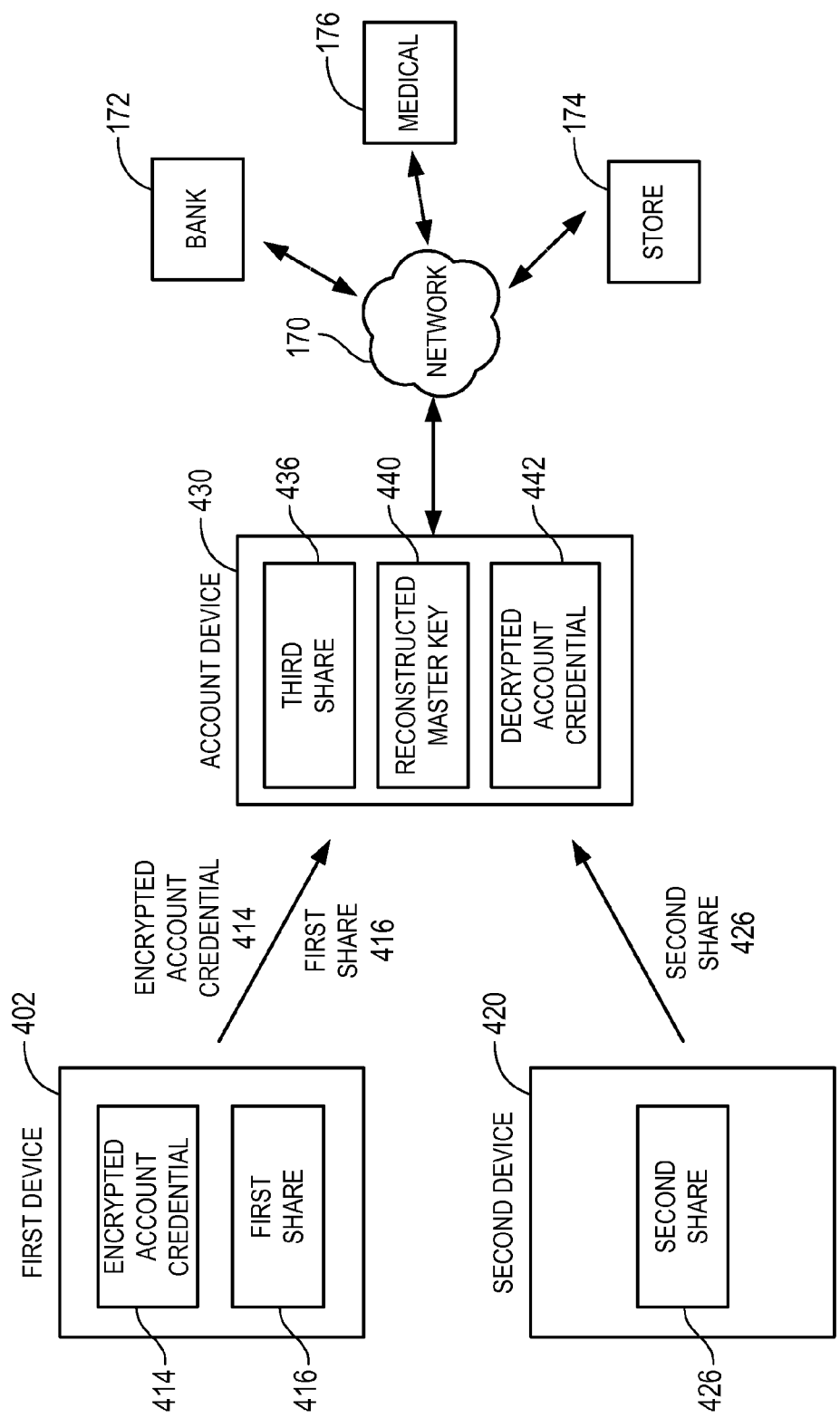
FIG. 4 is a diagram illustrating an example of utilizing multiple devices to decrypt an encrypted account credential.

With brief reference to FIG. 4, an example of multiple devices is illustrated. In this example, a first device 402 includes an encrypted account credential 414 and a first share 416 of the master key. Similarly, a second device 420 may include a second share 426 of the master key. Communication between the first and second devices 402 and 420 and an account device 430 allows the first and second device 402 and 420 to provide the encrypted account credential 414 and the first share 416 and the second share 426 of the master key to the account device 430. The account device 430 includes the third share 436 of the master key. The account device 430 may: receive the first and second share 416 and 426 of the master key and the encrypted account credential 414; reconstruct the master key 440 with the first share 416 and the second share 426 received from the first and second devices 402 and 420 with the third share 436 of the master key stored at the account device 430; decrypt the encrypted account credential 442 with the reconstructed master key 440; and enable access to an account (e.g., bank account 172, on-line store account 174, medical account 176, etc.) for a user based on the decrypted account credential 442, as previously described.

As one particular example, the first device may be an NFC-enabled mobile phone 402 storing the encrypted account credential 414 and the first share 416 of the master key. The second device may be a NFC card 420 (e.g., in a person's wallet) corresponding to the NFC-enable mobile phone 402 that stores a second share 426 of the master key. By putting the two together [the NFC card 420 and NFC-enabled mobile phone 402] in close proximity, the NFC card 420 and NFC-enabled mobile phone 402 may transmit the encrypted account credential 414 and the first share 416 and the second share 426 of the master key to the account device 430. In this way, the account device 430 may: receive the first and second share 416 and 426 of the master key and the encrypted account credential 414; reconstruct the master key 440 with the first share 416 and the second share 426 received from the NFC card 420 and NFC-enabled mobile phone 402 with the third share 436 of the master key stored at the account device 430; decrypt the encrypted account credential 414 with the reconstructed master key 440; and enable access to an account (e.g., bank account 172, on-line store account 174, medical account 176, etc.) for a user based on the decrypted account credential 442. Thus, the use of multiple devices can increase security. It should be appreciated that any suitable number of devices can be used for security purposes. Further, unlocking functions can also be used to increase security.

It should be appreciated that although particular examples of the types of devices, the number of devices, particular unlocking functions, etc., have been provided as illustrations, that embodiments of the invention may be utilized with a wide variety of different types of devices, different numbers of devices, and different unlocking functions.

Figure 5:
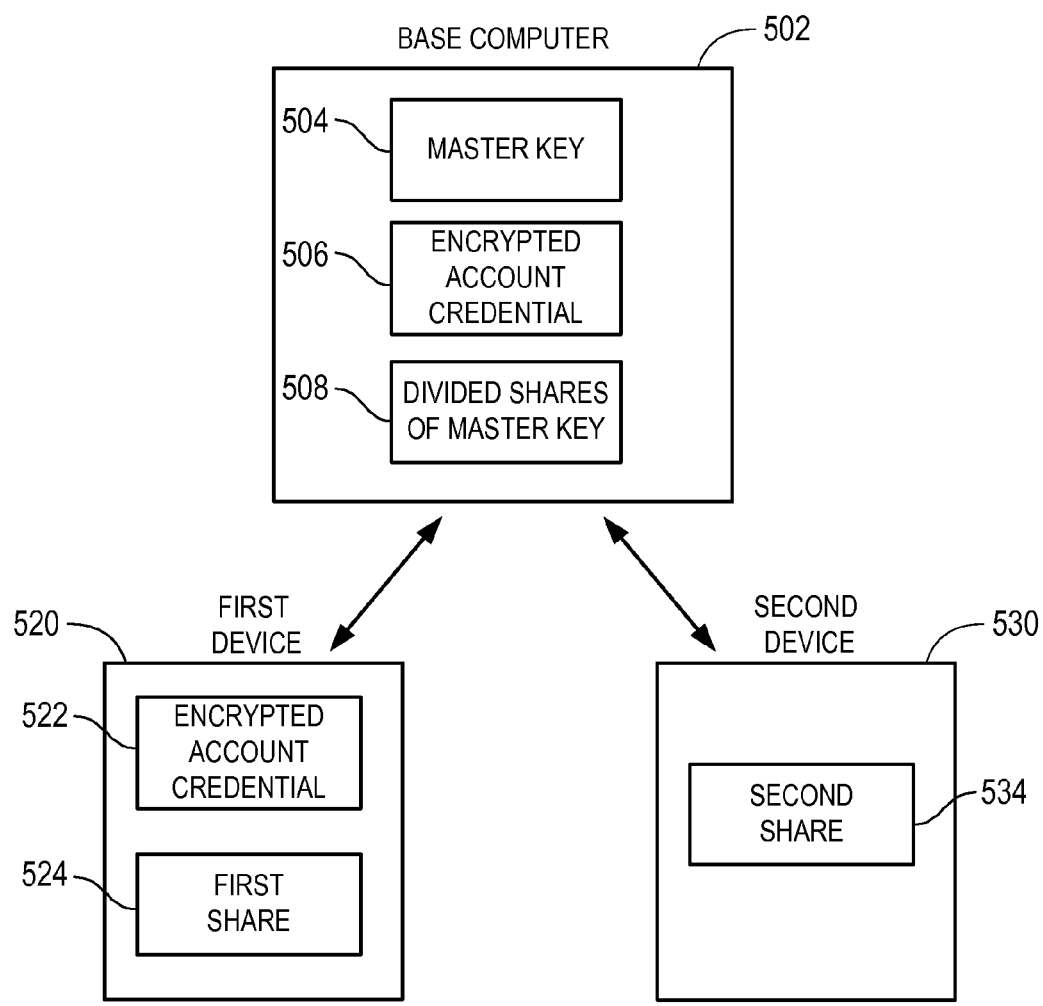
FIG. 5 is a diagram illustrating an example of utilizing a base computer to define and divide a master key.

Further, it should be appreciated that there are a wide variety of different ways that the master key, shares of the master key, and the account credential can be defined. For example, with brief reference to FIG. 5, in one example, a base computer 502 may be used to define a master key 504, an encrypted account credential 506, and the divided shares of the master key 508. The base computer 502 may then transmit the encrypted account credential 522 and the first share 524 of the master key to a first device 520. The base computer 502 may also transmit the second share 534 of the master key to a second device 530. In this example, the second device 530 may be the device that will be accessing the account (termed the account device). As an example, the account device 530 may initially provide the base computer 502 with the account credentials (e.g., username, password, website address, etc.). The base computer 502 may then generate the master key 504, the encrypted account credential 506, and the divided shares of the master key 508 and may transmit the encrypted account credential 522 and the first share 524 to the first device 520 and the second share 534 to the account device 530.

In this way, as previously described in detail, a user by utilizing a first device (e.g., a cell phone) 520 having the encrypted account credential 520 and the first share 524 can have his/her username and password automatically transmitted to the account device 530 (e.g., a home computer) in a secure manner for authentication such that the user does not have to enter their username and password, and may not even remember them, and can easily access the designated account on a website (e.g., bank account 172, on-line store account 174, medical account 176, etc.). This is accomplished in very secure and easy fashion. It should be appreciated that a wide variety of different methods to generate a master key, an encrypted account credential, and divided shares of the master key and to transmit divided shares of the master key to various devices may be utilized, and that this is just one example.

It should be appreciated that aspects of the invention previously described may be implemented in conjunction with the execution of instructions by processors of the devices, as previously described. Particularly, circuitry of the devices, including but not limited to processors, may operate under the control of a program, routine, or the execution of instructions to execute methods or processes in accordance with embodiments of the invention. For example, such a program may be implemented in firmware or software (e.g. stored in memory and/or other locations) and may be implemented by processors and/or other circuitry of the devices and the server. Further, it should be appreciated that the terms processor, microprocessor, circuitry, controller, etc., refer to any type of logic or circuitry capable of executing logic, commands, instructions, software, firmware, functionality, etc It should be appreciated that when the devices are mobile or wireless devices that they may communicate via one or more wireless communication links through a wireless network that are based on or otherwise support any suitable wireless communication technology. For example, in some aspects the wireless device and the other devices may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a mobile wireless device may therefore wirelessly communicate with other mobile devices, cell phones, other wired and wireless computers, Internet web-sites, etc.

The techniques described herein can be used for various wireless communication systems such as Code Division Multiple Access (CDMA), Time division multiple access (TDMA), Frequency Division Multiple Access (FDMA), Orthogonal Frequency-Division Multiple Access (OFDMA), Single Carrier FDMA (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers Interim Standard (IS)-2000, IS-95 and IS-856 standards. A TDMA system can implement a radio technology such as Global System for Mobile Communications (GSM). An OFDMA system can implement a radio technology such as Evolved Universal Terrestrial Radio Access; (Evolved UTRA or E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDM®, etc. Universal Terrestrial Radio Access (UTRA) and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), a tablet, a mobile computer, a laptop computer, a tablet, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a computer, a wired computer, a fixed computer, a desktop computer, a server, a point-of-sale device, an entertainment device, a set-top box, or any other suitable device. These devices may have different power and data requirements In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a Wi-Fi station) to access the other network or some other functionality.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method comprising:
   receiving at a second device a first share of a master key from a first device;
   receiving at the second device an encrypted account credential from the first device, the receiving of the first share of the master key and the encrypted account credential by the second device from the first device occurring when the first device is located within a defined physical proximity range of the second device;
   receiving at the second device a third share of the master key from a third device;
   reconstructing the master key with the first share of the master key, a second share of the master key, and the third share of the master key at the second device;
   decrypting the encrypted account credential with the reconstructed master key; and
   enabling access to an account based upon the decrypted account credential at the second device.

2. The method of claim 1, further comprising unlocking the first device.

3. The method claim 2, wherein, unlocking the first device comprises a physical action applied to the first device.

4. The method claim 3, wherein, the physical action applied to the first device in combination with the encrypted account credential enables access to the account.

5. The method claim 1, wherein, the encrypted account credential includes a username and a password.

6. The method claim 5, wherein, the encrypted account credential includes a website that includes the account.

7. The method claim 1, wherein, the first device is a mobile device.

8. The method claim 7, wherein, the second device is a non-mobile device.

9. The method claim 1, wherein, the first device is a near field communication (NFC) card.

10. The method claim 1, wherein, the encrypted account credential further comprises randomized data.

11. The method claim 1, further comprising receiving a digital signature with the encrypted account credential.

12. The method of claim 1, wherein, shares are distributed to multiple devices.

13. An apparatus comprising:
    an interface; and
    a hardware processor to execute operations including:
       receiving from the interface a first share of a master key from a first device;
       receiving from the interface an encrypted account credential from the first device, the receiving of the first share of the master key and the encrypted account credential occurring when the first device is located within a defined physical proximity range of the apparatus;
       receiving from the interface a third share of the master key from a third device;
       reconstructing the master key with the first share of the master key, a second share of the master key, and the third share of the master key;
       decrypting the encrypted account credential with the reconstructed master key; and
       enabling access to an account based upon the decrypted account credential.

14. The apparatus of claim 13, wherein, the encrypted account credential includes a username and a password.

15. The apparatus of claim 14, wherein, the encrypted account credential includes a website that includes the account.

16. The apparatus of claim 13, wherein, the first device is a mobile device.

17. The apparatus of claim 13, wherein, the first device is a near field communication (NFC) card.

18. The apparatus of claim 13, wherein, the encrypted account credential further comprises randomized data.

19. An apparatus comprising:
    means for receiving a first share of a master key from a first device;
    means for receiving an encrypted account credential from the first device, the receiving of the first share of the master key and the encrypted account credential occurring when the first device is located within a defined physical proximity range of the apparatus;
    means for receiving a third share of the master key from a third device;
    means for reconstructing the master key with the first share of the master key, a second share of the master key, and the third share of the master key;
    means for decrypting the encrypted account credential with the reconstructed master key; and
    means for enabling access to an account based upon the decrypted account credential.

20. The apparatus of claim 19, wherein, the encrypted account credential includes a username and a password.

21. The apparatus of claim 20, wherein, the encrypted account credential includes a website that includes the account.

22. The apparatus of claim 19, wherein, the first device is a mobile device.

23. The apparatus of claim 19, wherein, the first device is a near field communication (NFC) card.

24. The apparatus of claim 19, wherein, the encrypted account credential further comprises randomized data.

25. A computer program product executed at a second device comprising:
    a non-transitory computer-readable medium comprising code for:
       receiving a first share of a master key from a first device;
       receiving an encrypted account credential from the first device, the receiving of the first share of the master key and the encrypted account credential by the second device from the first device occurring when the first device is located within a defined physical proximity range of the second device;
       receiving a third share of the master key from a third device;
       reconstructing the master key with the first share of the master key, a second share of the master key, and the third share of the master key;
       decrypting the encrypted account credential with the reconstructed master key; and
       enabling access to an account based upon the decrypted account credential.

26. The computer program product of claim 25, wherein, the encrypted account credential includes a username and a password.

27. The computer program product of claim 26, wherein, the encrypted account credential includes a website that includes the account.

28. The computer program product of claim 25, wherein, the first device is a mobile device.

29. The computer program product of claim 28, wherein, the second device is a non-mobile device.

30. The computer program product of claim 25, wherein, the first device is a near field communication (NFC) card.

31. The computer program product of claim 25, wherein, the encrypted account credential further comprises randomized data.

32. An apparatus comprising:
an interface; and
a hardware processor to execute operations including:
transmitting from the interface a first share of a master key to a second device, and transmitting an encrypted account credential to the second device, the transmission of the first share of the master key and the encrypted account credential to the second device occurring when the apparatus is located within a defined physical proximity range of the second device, wherein the second device reconstructs the master key with the first share of the master key, a second share of the master key stored at the second device, and a third share of the master key received from a third device to decrypt the encrypted account credential to enable access to an account based upon the decrypted account credential.

33. The apparatus of claim 32, wherein, the encrypted account credential includes a username and a password.

34. The apparatus of claim 33, wherein, the encrypted account credential includes a website that includes the account.

35. The apparatus of claim 32, further comprising an unlocking sensor to unlock the apparatus to enable transmission of the encrypted account credential and the first share of the master key.

36. The apparatus of claim 35, wherein, the unlocking sensor is a physical sensor such that when a physical action is applied to the apparatus that is sensed by the physical sensor the apparatus is unlocked.

37. The apparatus of claim 36, wherein, the physical sensor is a motion sensor.

38. The apparatus of claim 36, wherein, the physical sensor is a microphone.

39. The apparatus of claim 32, wherein, the apparatus is a mobile device.

40. The apparatus of claim 32, wherein, the apparatus is a near field communication (NFC) card.

41. An apparatus comprising:
means for communicating with a second device;
means for transmitting a first share of a master key to the second device; and
means for transmitting an encrypted account credential to the second device, the transmission of the first share of the master key and the encrypted account credential to the second device occurring when the apparatus is located within a defined physical proximity range of the second device, wherein the second device reconstructs the master key with the first share of the master key, a second share of the master key stored at the second device, and a third share of the master key received from a third device to decrypt the encrypted account credential to enable access to an account based upon the decrypted account credential.

42. The apparatus of claim 41, wherein, the encrypted account credential includes a username and a password.

43. The apparatus of claim 42, wherein, the encrypted account credential includes a website that includes the account.

44. The apparatus of claim 41, further comprising means for unlocking the apparatus to enable transmission of the encrypted account credential and the first share of the master key.

45. The apparatus of claim 44, wherein, the means for unlocking the apparatus includes physical sensor means such that when a physical action is applied to the apparatus that is sensed by the physical sensor means the apparatus is unlocked.

46. The apparatus of claim 41, wherein, the apparatus is a mobile device.

47. The apparatus of claim 41, wherein, the apparatus is a near field communication (NFC) card.

48. A method implemented at a first device comprising:
transmitting a first share of a master key to a second device; and
transmitting an encrypted account credential to the second device, transmission of the first share of the master key and the encrypted account credential to the second device occurring when the first device is located within a defined physical proximity range of the second device, wherein the second device reconstructs the master key with the first share of the master key, a second share of the master key stored at the second device, and a third share of the master key received from a third device to decrypt the encrypted account credential to enable access to an account based upon the decrypted account credential.

49. The method of claim 48, wherein, the encrypted account credential includes a username and a password.

50. The method of claim 49, wherein, the encrypted account credential includes a website that includes the account.

51. The method of claim 48, further comprising unlocking the first device to enable transmission of the encrypted account credential and the first share of the master key.

52. The method of claim 51, wherein, unlocking the first device includes detecting when a physical action is applied to the first device.

53. The method of claim 48, wherein, the first device is a mobile device.

54. The method of claim 48, wherein, the first device is a near field communication (NFC) card.

55. A computer program product executed at a first device comprising:
a non-transitory computer-readable medium comprising code for:
transmitting a first share of a master key to a second device; and
transmitting an encrypted account credential to the second device, transmission of the first share of the master key and the encrypted account credential to the second device occurring when the first device is located within a defined physical proximity range of the second device, wherein the second device reconstructs the master key with the first share of the master key, a second share of the master key stored at the second device, and a third share of the master key received from a third device to decrypt the encrypted account credential to enable access to an account based upon the decrypted account credential.

56. The computer program product of claim 55, wherein, the encrypted account credential includes a username and a password.

57. The computer program product of claim 56, wherein, the encrypted account credential includes a website that includes the account.

58. The computer program product of claim 55, further comprising code for unlocking the first device to enable transmission of the encrypted account credential and the first share of the master key.

59. The computer program product of claim 58, wherein, unlocking the first device includes code for detecting when a physical action is applied to the first device.

60. The computer program product of claim 55, wherein, the first device is a mobile device.

61. The computer program product of claim 55, wherein, the first device is a near field communication (NFC) card.

* * * * *